United States Patent [19]

Gordon

[11] Patent Number: 4,832,555
[45] Date of Patent: May 23, 1989

[54] GASKET HOLDING AND FEEDING MAGAZINE

[76] Inventor: John H. Gordon, 855 Brandywine Rd., Downingtown, Pa. 19335

[21] Appl. No.: 169,839

[22] Filed: Mar. 18, 1988

[51] Int. Cl.⁴ .............................................. B65H 5/00
[52] U.S. Cl. .................................... 414/223; 29/809;
    29/235; 414/224; 414/225; 414/403
[58] Field of Search ............. 414/223, 403, 404, 224,
    414/414, 225; 29/809, 235; 221/76, 82, 86, 186

[56] References Cited

U.S. PATENT DOCUMENTS

| | | | |
|---|---|---|---|
| 3,199,694 | 8/1965 | Garney et al. | 414/414 |
| 3,727,794 | 4/1973 | Di Eranco | 221/82 |
| 3,851,369 | 12/1974 | Eschholz | 29/809 |

Primary Examiner—Robert J. Spar
Assistant Examiner—Donald W. Underwood
Attorney, Agent, or Firm—Steele, Gould & Fried

[57] ABSTRACT

A gasket holding and feeding magazine is described which includes a plurality of similar, adjacent compartments, each of which is sized to hold a single gasket therein. The magazine is moved over a stationary floor plate within which is formed a bottom opening of size to permit a gasket to drop therethrough. As each compartment of the magazine is moved into registry above the floor opening, a gasket will drop through the opening and will be directed to a lower gasket holding and clamping plate. The clamping plate securely holds the gasket to allow a belling mandrel to be inserted through the clamping plate and to secure the gasket. The mandrel will then automatically pick-up the gasket as the mandrel is advanced relative to the clamping plate whereby the gasket will be automatically inserted into the pipe end during the belling operation. Upon completion of the pipe bell and cooling of the belled end, when the mandrel is withdrawn, the gasket will remain encapsulated within the belled end of the pipe.

6 Claims, 5 Drawing Sheets

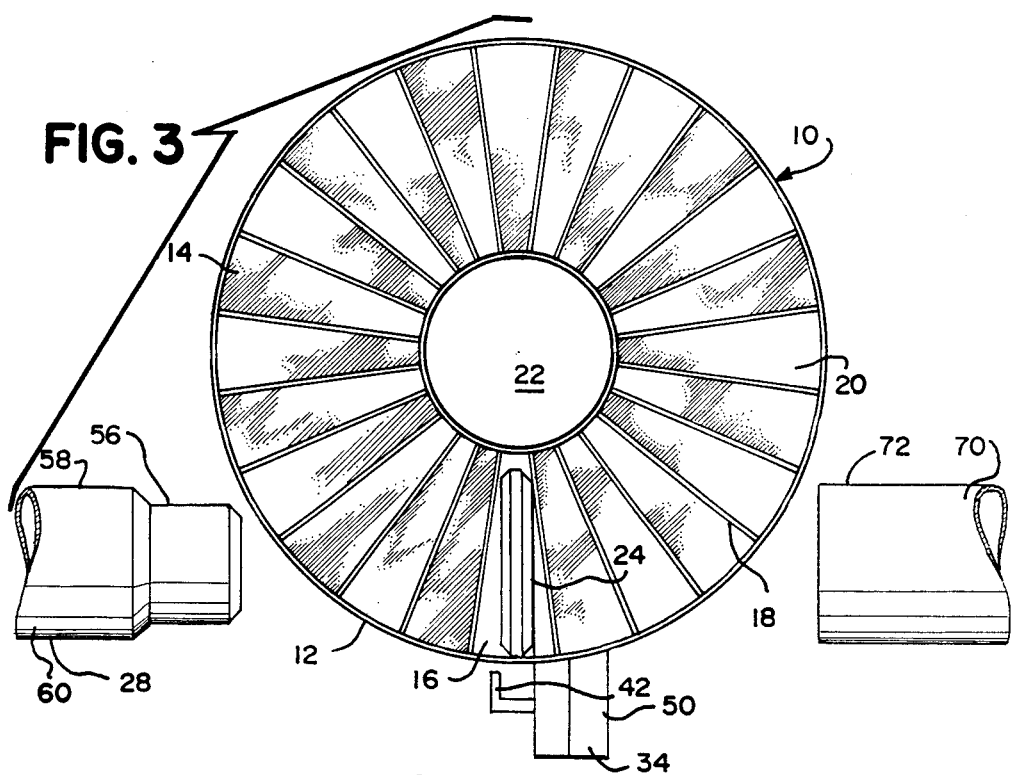
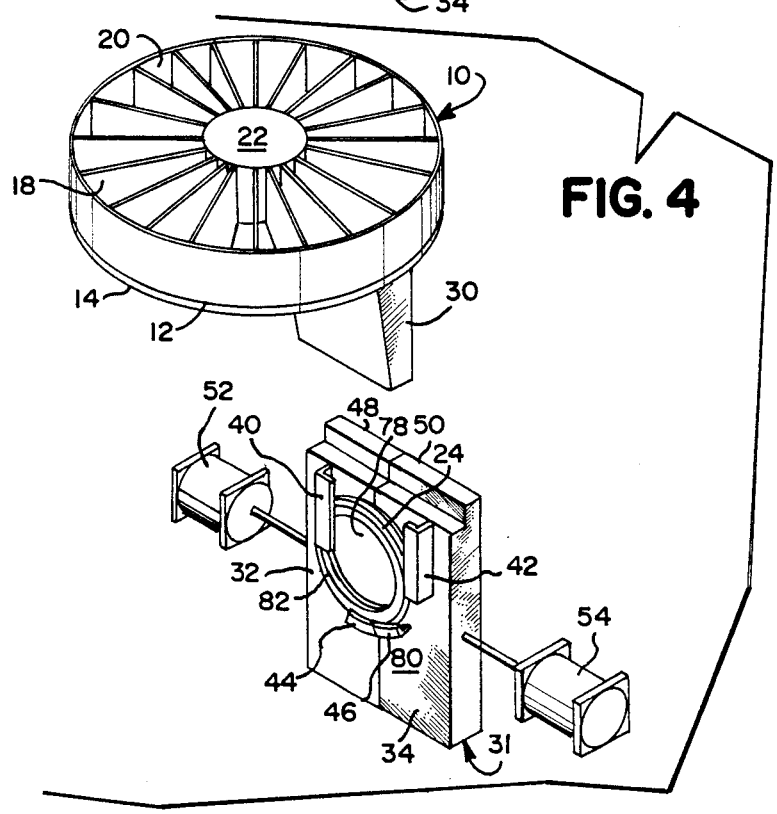

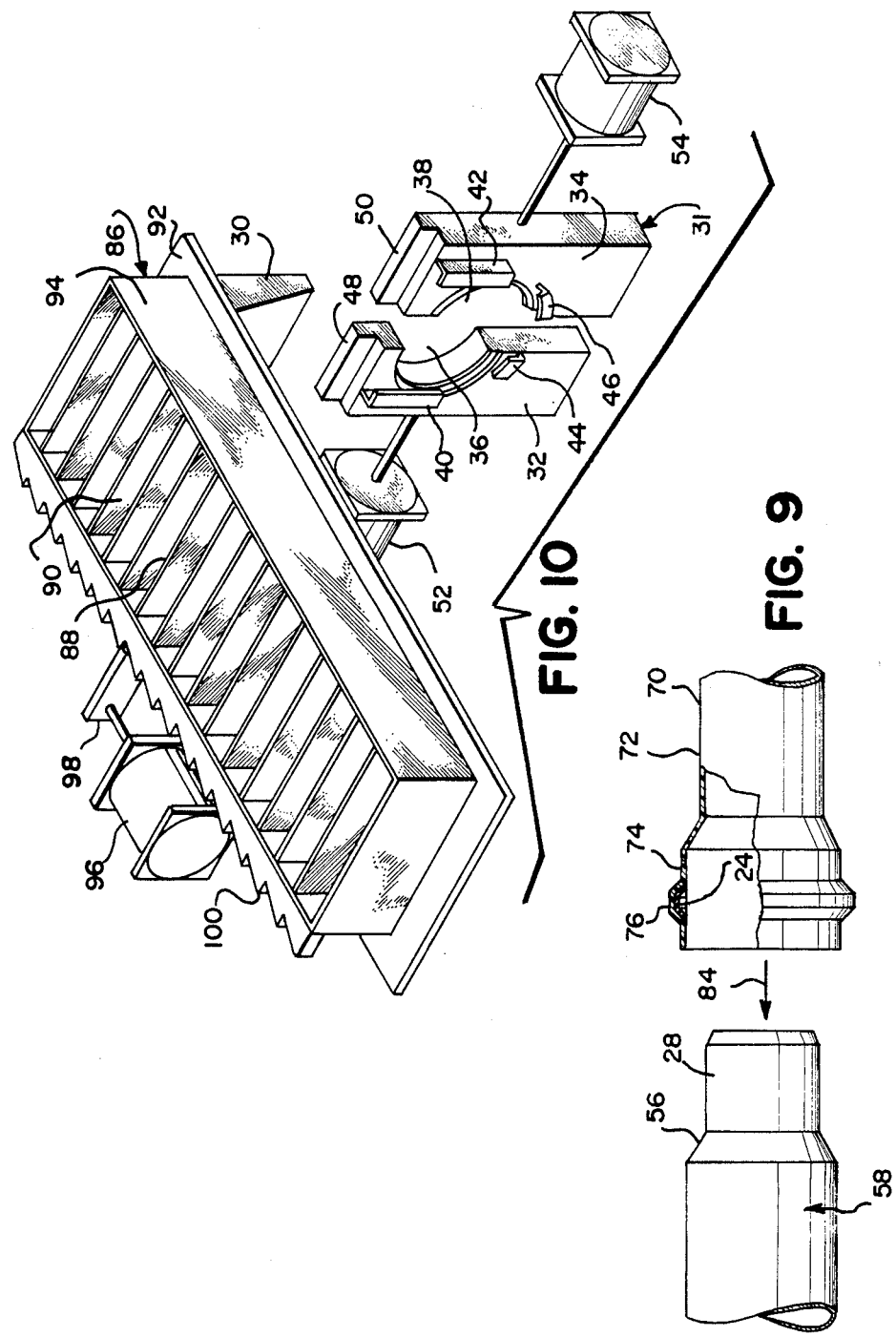

1

GASKET HOLDING AND FEEDING MAGAZINE

BACKGROUND OF THE INVENTION

1. Field of the Invention

The present invention relates generally to the field of manufacturing plastic pipes, and more particularly, is directed to an attachment to a pipe belling machine to load resilient gaskets successively and automatically onto a belling mandrel during each cyclical operation of the mandrel in order to produce a belled pipe end complete with the gasket encapsulated within the bell construction.

2. Discussion of the Prior Art

Plastic pipes for various commercial and industrial applications have long been in use and a great majority of such plastic pipes are fabricated of heat softenable material, for example, polyethylene plastic of suitable diameter and thickness for the intended use. Industry recommendations and government specifications have been developed throughout the years to standardize manufacturing objectives and product production whereby known pipe dimensional and quality parameters have now been placed in use on an industry-wide basis.

Plastic pipes are normally used in both pressure and atmospheric piping systems. Considerable energies have been expended by prior workers in the art to develop pipe joining systems which can be readily field constructed and which at the same time can be predictably and reliably considered to be trouble-free and leak-proof after installation. In the most common types of plastic pipe piping systems, the pipes comprising the pipe line will be furnished in usual ten foot lengths or twenty foot lengths. The piping system can be made up by securing the pipe lengths together by employing a sufficient number of pipe lengths to span the entire designed length of the main pipe line and any branches that may be connected thereto. In order to join the individual lengths of pipe in end-to-end juxtaposition, it is now the common practice to treat one end of each length of pipe in a manner to expand or bell that end to form an enlarged socket or bell shape to receive therein the unbelled end of the next adjacent length of plastic pipe. In order to fabricate the expanded or belled end, automatic pipe belling machines are now in common use whereby one end of each length of plastic pipe can be automatically heated to thereby soften that end as the pipe length itself is transversely indexed across the machine to a pipe belling station. A reciprocating mandrel is usually situated at the belling station whereby the previously softened end of the pipe can be shaped to a predetermined profile by the belling mandrel. Upon cooling the pipe end and removing the mandrel, a permanently shaped bell or socket will then be provided in each length of plastic pipe. Typical of such mechanisms is the pipe belling machine disclosed and described in U.S. Pat. No. 4,574,942 wherein the present applicant was the inventor of the said machine.

More recently, in order to facilitate the insertion of a resilient gasket into the belled end of the pipe to provide leak-proof junctions upon joining adjacent lengths of pipe, improved mandrels have been developed whereby a radially reciprocating component can be designed to alternately expand and retract from the peripheral surface of the mandrel during the belling process to automatically impress a radially inwardly open, circular groove in the pipe bell to receive and secure a sealing gasket therewithin prior to use. One such belling mandrel has been disclosed and described in U.S. Pat. No. 4,545,951, which patent is also owned by the present applicant. While the automatic pipe belling machines which are known in the prior art and the belling mandrels with or without expanding segments are also known in the prior art, experience has shown that the proper insertion of the resilient, sealing gasket within the belled pipe end remains a time consuming and tedious job which can add significantly to the total cost of the finished product and to the reliability of the piping system after it has been made up in the field.

Accordingly, the need remains to provide an improved apparatus and method for inserting a resilient gasket within the belled end of a length of plastic pipe.

SUMMARY OF THE INVENTION

The present invention relates generally to plastic pipe fabrication, and more particularly, is directed to an indexing type of gasket holding and feeding magazine suitable for installation at existing automatic plastic pipe belling machines.

The gasket holding and feeding magazine of the present invention comprises generally a compartmentalized magazine to store a plurality of gaskets of preselectd size, one in each compartment. The magazine may be circular in configuration or rectangular in configuration or of other suitable shape wherein a plurality of gasket holding compartments can be formed. The magazines are designed to be rotated in the case of circular magazines or linearly advanced in the case of rectangular magazines or other suitable movement as may be fitting. A particular magazine shape may be chosen whereby each gasket holding compartment can be serially advanced to a feeder, funnel or chute means to feed one and only one gasket to the belling mandrel during each cyclical reciprocation of the belling mandrel. The feeder funnel or chute means preferably is elongated and funnel-shaped in configuration and is positioned to direct each gasket in turn to a gasket holding and clamping plate which comprises separable clamp halves. The gasket holding plate includes means to receive and position gaskets serially delivered through the feeder funnel means in axial alignment with the belling mandrel.

When a gasket has been introduced to the gasket holding and clamping plate, the gasket clamp halves are urged together to tightly retain the gasket in a manner to receive the fuller profile of the mandrel without distortion or deformation. With the gasket clamp halves closed, the belling mandrel can then be forwardly urged through the central opening of the gasket whereby the gasket will ride over the mandrel profile to a position on the rear body of the mandrel for releasable association upon the mandrel. Once the gasket has been properly seated on the mandrel, the gasket clamp halves will open to allow the mandrel with the gasket secured thereon to move forwardly of the gasket holding and clamping plate to enter the previously heated, unbelled end of a length of plastic pipe to form the desired bell shape in the pipe end in a known manner. The plastic walls of the pipe will be urged tightly against the mandrel profile and the associated gasket in a known manner to conform to the outer peripheral configuration of the mandrel with the associated gasket. In this manner, the pipe will automatically be provided with an interiorly facing groove, which groove rceives the gasket therein in a secure manner. When the newly belled pipe end is cooled in a manner well known to those skilled in the art, the plastic pipe sidewalls will harden in their shaped configuration and thereby encapsulate the gasket within the peripheral groove which was formed using the gasket as a mold. The mandrel can then be reciprocated rearwardly from the pipe using a stripper plate or other known mechanism to withdraw the mandrel to its initial position, ready for its next cyclical belling operation. With the belled pipe end cooled and hardened, the gasket will be trapped within the interiorly opened peripheral groove and the gasket will then be stripped from the mandrel as the mandrel is withdrawn and will be permanently encapsulated within the belled pipe end.

It is an important feature of this invention to provide gasket holding and indexing magazines of various configurations and indexing operations. In one embodiment, a circular, compartmented magazine is employed above the gasket holding and clamping plate wherein the magazine is rotated in a horizontal plane. In another embodiment, the magazine can be designed of circular configuration wherein the magazine is designed and intended to rotate in a vertical plane, much in the manner of a ferris wheel. In another embodiment, the magazine can be fabricated of generally rectangular, compartmentalized construction and suitable linear indexing mechanism can be provided. It will be appreciated that compartmentalized magazines or other varying configurations can be designed and can be utilized in the present environment so long as the magazine can be made to feed gaskets, one at a time, to a feeder funnel for the serial introduction to a separable gasket holding and clamping plate.

It is therefore an object of the present invention to provide an improved gasket holding and feeding magazine of the type set forth.

It is another object of the present invention to provide a novel gasket holding and feeding magazine comprising a plurality of gasket holding compartments, means to serially advance the compartments to registration over an opening and means to receive the gasket in turn through the opening for delivery to a position in axial alignment with a pipe belling mandrel.

It is another object of the present invention to provide a novel gasket holding and feeding magazine of cylindrical configuration having a plurality of compartments and wherein the magazine is rotatably indexed in a horizontal plane.

It is another object of the present invention to provide a novel gasket holding and feeding magazine that is fabricated of compartmentalized cylindrical configuration and wherein the magazine is rotated in a vertical plane to deliver gaskets one at a time to a gasket feeder funnel.

It is another object of the present invention to provide a novel gasket holding and feeding magazine of generally compartmentalized rectangular configuration in combination with means to index the magazine forwardly to deliver gaskets one at a time to a gasket feeder funnel.

It is another object of the present invention to provide a novel gasket holding and feeding magazine that is simple in design, inexpensive in manufacture and trouble-free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 3 is a top plan view looking from line 3—3 in FIG. 2, in the direction of the arrows.

FIG. 4 is an exploded, schematic view similar to FIG. 2 showing the gasket clamp halves in a closed position.

FIG. 9 is an elevational view similar to FIG. 8, showing the belling mandrel removed from the belled pipe end.

FIG. 10 is a perspective view similar to FIG. 2 showing a modified type of gasket holding and feeding mechanism.

DETAILED DESCRIPTION OF THE PREFERRED EMBODIMENTS OF THE INVENTION

Figures 1, 2:
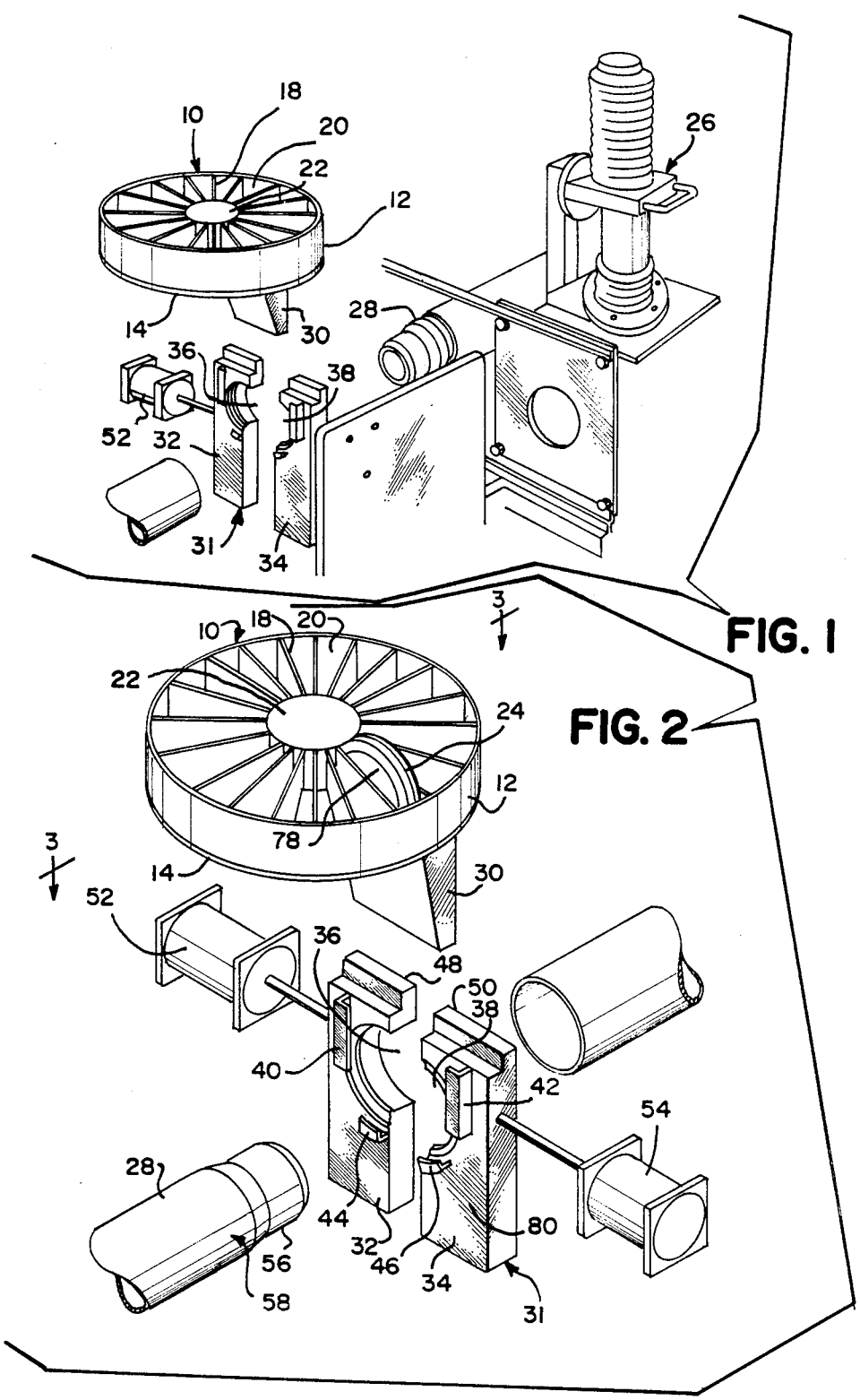
FIG. 1 is a perspective view of the belling end of an automatic pipe belling machine showing the gasket holding and feeding magazine of the present invention in operating position.
FIG. 2 is an enlarged, schematic perspective view of a circular gasket holding and feeding magazine positioned above a gasket holding and clamping plate with the belling mandrel in its initial, retracted position.

Although specific terms are used in the following description for the sake of clarity, these terms are intended to refer only to the particular structure of the invention selected for illustration in the drawings, and are not intended to define or limit the scope of the invention.

Referring now to the drawings, there is shown in FIG. 1 a portion of a pipe belling machine 26 of known construction for example an automatic pipe belling machine as disclosed in the present applicant's prior patents, U.S. Pat. Nos. 4,545,951 and 4,574,942, which machines have been manufactured and sold by United Plastics Machinery, Inc., Exton, Pa.

The prior pipe belling machine designs have been modified as necessary to mount a gasket holding and feeding magazine 10 in position to automatically deliver a plurality of gaskets serially to a gasket holding and clamping plate 31 which is arranged in axial alignment with the belling mandrel 18. In a known manner, the apparatus comprising the pipe belling machine 26 receives discrete lengths of plastic pipe from an extruder and transversely indexes the lengths of pipe across the machine while preheating one end of each length of pipe to soften the plastic material for pipe belling purposes. The pipe belling machine functions to axially align each length of pipe with the belling mandrel and to synchronize the operating of the mandrel with the movement of the pipe wherein one end of each length of pipe will be impressed with a bell shape upon each cyclical operation of the mandrel. In previous apparatuses, it was the common practice to form a circular, inwardly open groove in the pipe bell at the time the bell was formed to manually receive a sealing gasket therein for use in sealing the junction between adjacent lengths of pipe. The apparatus of the present invention automates the gasket insertion process whereby the gasket itself will be used to form the inwardly open groove in the pipe bell and the gasket will be retained within the groove after the pipe bell has been formed.

In one embodiment, the gasket magazine 10 is fabricated of a shallow cylindrical configuration and is designed to rotate about its hub 22 in a horizontal plane above the gasket holding and clamping plate 31. The magazine 10 comprises generally a stationary floor 14 which may be of circular configuration to conform to the general outline of the magazine itself. The magazine is subdivided into a plurality of gasket holding compartments 20 by a plurality of similar compartment walls 18. A peripheral circular sidewall 12 is concentric with the hub 22 and may be secured thereto by the plurality of compartment walls 18 in known manner. As illustrated, the compartment walls are preferably arranged in radial orientation, but such orientation is not necessarily required for functioning of the gasket magazine 10. The hub 22 is rotated in known manner by a motor (not shown). The motor should be so controlled and synchronized with the operation of the belling machine 26 and the belling mandrel 28 so that one comparment 20 will be advanced upon each cyclical operation of the mandrel 28 to thereby deliver one gasket 24 to the gasket holding and clamping plate 31 for each cyclical operation of the belling apparatus. As best seen in FIG. 3, the circular, stationary floor 14 is provided with an elongaged opening 16 of a suitable size and configuration to allow each gasket 24 to drop through the opening 16 when the magazine 10 is rotated to serially deliver each gasket in turn in alignment over the opening. As shown, a feeder funnel 30 is bottomly affixed to the stationary floor 14 and provides a guided, enclosed gravity fall path for each gasket 24 as it drops from its associated compartment 20 through the aligned floor opening 16 for delivery to the gasket holding and clamping plate 31. The feeder funnel or chute 30 is illustrated in generally truncated triangular cross sectional configuration but it will be appreciated that funnels of other sizes and shapes could be employed to guide the gasket toward the gasket holding plate 31.

Figure 5:
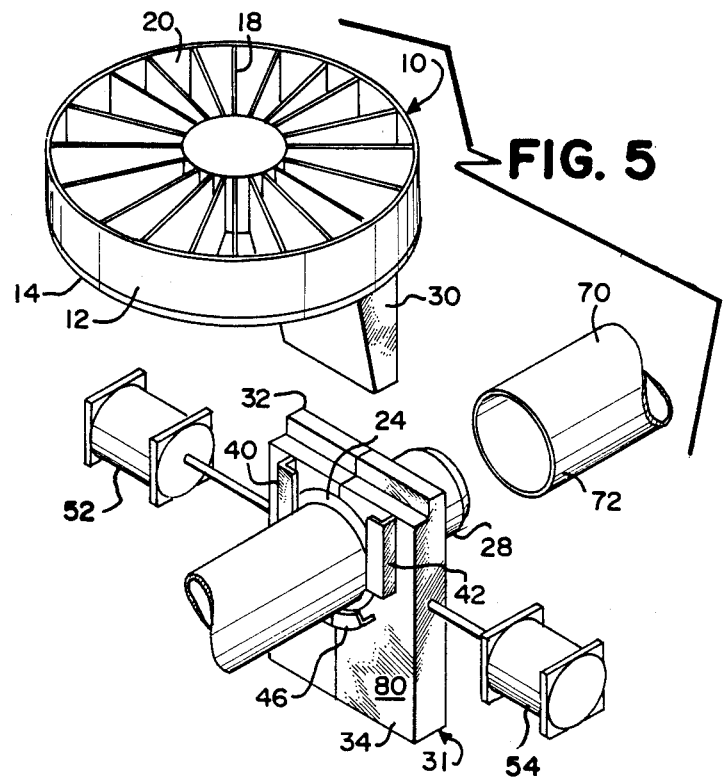
FIG. 5 is a perspective, schematic view similar to FIG. 2 showing the gasket clamp halves together with the belling mandrel being moved forwardly to pick-up the gasket.

As best seen in FIGS. 2, 4 and 5, the gasket holding and clamping plate 31 comprises a pair of horizontally reciprocating gasket clamp halves 32, 34 each of which is provided with a semi-circular opening 36, 38 of size corresponding to the size of the gasket 24 being employed. Left and right side guides 40, 42 and left and right bottom positioners 44, 46 are respectively affixed to the front face 80 of the plate 31 to receive and guide each gasket in turn as it drops through the feeder chute 30. As shown, the side guides 40, 42 and the bottom positioners 44, 46 are preferably generally L-shaped in configuration to provide a receiving area in front of the front face 80 to easily receive each gasket in turn as it drops through the funnel or chute 30. The normally open clamping plate halves 32, 34 are tightly clamped together to receive and hold the gasket 24 when the mandrel 38 is advanced in a manner illustrated in FIG. 5.

In operation, each of the gasket holding and clamping plate halves 32, 34 can be equipped with a hydraulic cylinder 52, 54 or other suitable mechanism to horizontally move the plate halves 32, 34 relative to each other in cyclical conformity to the cyclical operation of the belling mandrel 28. In a known manner, the plate halves 32, 34 can be provided with top guides 48, 50 which reciprocate in conventional grooves (not illustrated) in a known manner to assure a smooth, horizontal sliding operation of the clamping plate halves. Thus, it is seen by controlling the function of the clamp operating cylinders 52, 54, the clamping plates halves 32, 34 can be either urged apart as illustrated in FIGS. 2, 6 and 7 or can be urged to tightly clamp together as shown in FIGS. 4 and 5.

In conjunction with the gasket feeding magazine 10 of the present invention, the rear body 60 of the belling mandrel 28 is preferably provided with a position or seat 58, which seat is rearwardly positioned relative to the shaped or profiled nose 56 of the mandrel 28. The seat 58 is designed and intended to receive therein a gasket 24 upon each forward movement of the mandrel 28. In conventional manner, the mandrel rear body 60 may terminate in an integral rear flange 62 for interconnection with the mandrel cylinder flange 66 by employing usual bolts 68 in known manner. The mandrel cylinder 64 may be of hydraulic or pneumatic operation in known manner. The mandrel 28 can be reciprocated forwardly and rearwardly in times sequence in a known manner to impress a belled shape 74 in one end of a length of a plastic pipe 70. See FIG. 9.

In operation, a plurality of gaskets 24 are loaded into the gasket magazine 10, one gasket in each compartment 20. The magazine hub 22 is rotated by its motor (not shown) in synchronization with the operation of the belling apparatus 26 to rotatively advance each gasket 24 into a rotative position in registry above the floor opening 16. Each gasket then in turn will fall through the opening 16 and will be guided in its downward travel through the feeder funnel or chute 30. In this portion of the belling cycle, the clamp operating cylinders 52, 54 will be automatically functioned by the machine control apparatus (not shown) to close the gasket clamp halves 32, 34 to receive the dropping gasket 24 within the gasket positioning members 40, 42, 44, 46. See FIGS. 2 and 5. When the gasket has been dropped into association with the gasket holding and clamping plate 31, the halves 32, 34 are already clamped together as illustrated in FIGS. 4 and 5. Simultaneously, the mandrel cylinder 64 is activated to forwardly urge the mandrel through the clamping plate opening formed by the joined semi-circular openings 36, 38 and through the central opening 78 provided in the gasket 24. In this manner, the gasket 24 will be tightly held within the gasket holding and clamping plate 31 and will allow the mandrel 28 to move forwardly relative to the securely held gasket whereby the gasket will ride up over the profiled nose 56 of the mandrel and over a portion of the mandrel rear body 60 until the interior periphery 82 of the gasket 24 contacts the mandrel seat 58. The resilient construction of the gasket will flex as necessary to allow full insertion of the mandrel 28 up to the peripheral seat 58. When the seat 58 is contacted by the gasket periphery 82, the gasket will be properly positioned and exteriorly secured upon the mandrel. Once the gasket 24 is properly seated on the mandrel at seat 58, the clamp operating cylinders 52, 54 will again automatically be functioned in a known manner to pull the gasket clamp halves 32, 34 apart and to allow the mandrel cylinder 64 to urge the mandrel 28 forwardly of the gasket holding and clamping plate 31. See FIG. 7.

Figure 6:
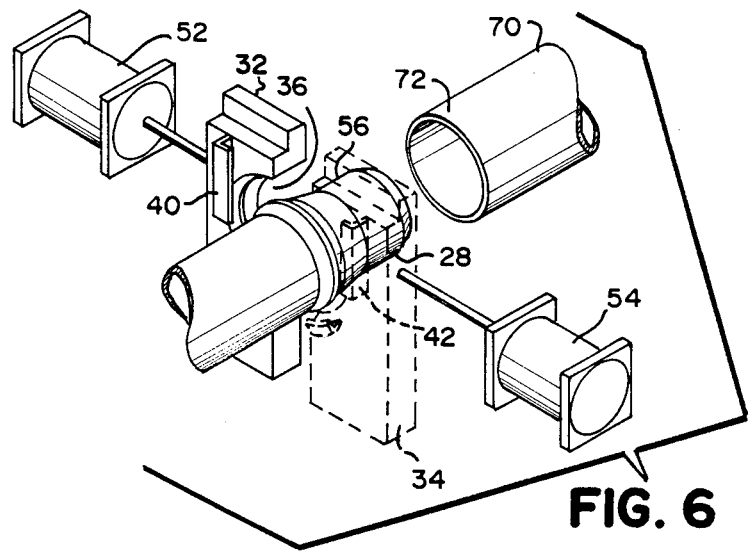
FIG. 6 is an enlarged, perspective view showing the belling mandrel about to enter the previously heated end of the plastic pipe, with portions shown in phantom lines for illustrative purposes.
Figure 7:
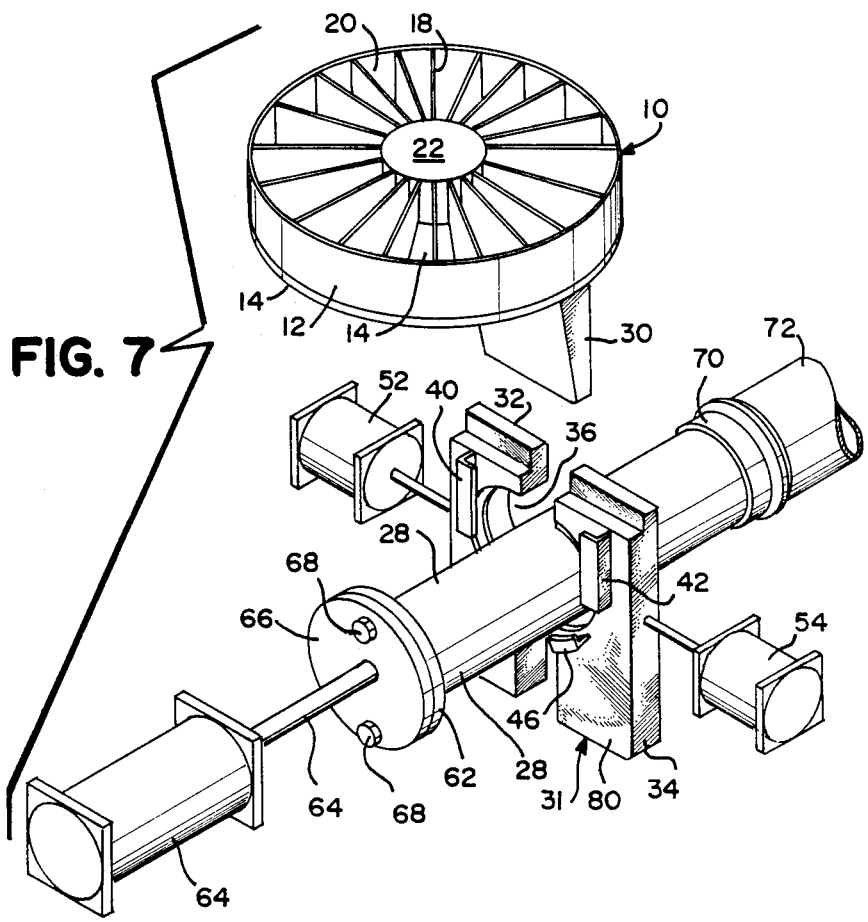
FIG. 7 is a perspective view similar to FIG. 5, showing the gasket clamp halves separated and the mandrel in position to impress a bell shape upon the end of the plastic pipe.
Figure 8:
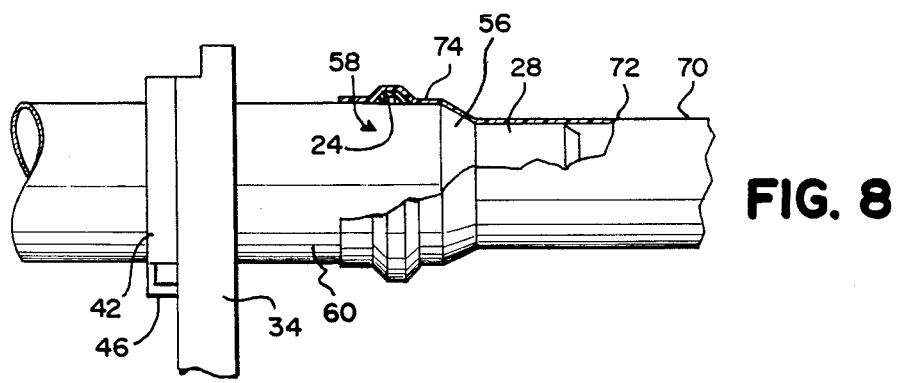
FIG. 8 is an elevational view of the belling mandrel within the pipe end and partially broken away to expose interior construction details.

As the belling mandrel 28 is moved to its forwardmost position as illustrated in FIG. 6, the mandrel will be forced interiorly of the previously heated unbelled end 72 of a length of plastic pipe 70 to thereby impress the desired bell shape 74 in the end of the plastic pipe in known manner. It is noteworthy that the gasket 24 will act as a mold or form to provide an additional outwardly expanded shape radially outwardly of the mandrel profile. Accordingly, the gasket 24 itself will act as a forming article and will form an expanded gasket holding groove 76 in the belled end 74 of the plastic pipe 70. With the belling mandrel in place within the belled pipe end 74, the pipe can then be cooled in known manner to solidify the bell shape by hardening the plastic pipe sidewalls upon cooling. It will be appreciated that the gasket 24 will then be encapsulated within the expanded gasket holding groove 76. Accordingly, upon withdrawing the belling mandrel 28 in the direction of the arrow 84 as illustrated in FIG. 9, the encapsulation of the gasket within the pipe bell will allow rearward movement of the mandrel by unseating the interior periphery 82 of the gasket from the peripheral seat 58 on the mandrel. Accordingly, upon withdrawal of the mandrel 28, the gasket 24 will remain associated within the belled end 74 of the pipe and thereby be available for immediate use without any additional manual gasket inserting procedures.

As shown in FIG. 10, it will be appreciated that other types and shapes of gasket holding magazines 86 can be employed to perform the same function. For example, the magazine could be of rectangular or other shape by providing planar sidewalls 94 with a plurality of transverse walls 88 to thereby define a plurality of gasket receiving compartments 90. Then, by advancing the magazine 86 relative to the stationary floor 92 within which an opening (not shown) is provided in registry above the chute 30 in the manner hereinbefore described, a plurality of gaskets 24 can be advanced serially to drop through the funnel or chute 30. One such mechanism could include a cylinder 96 which could be designed to index the magazine 86 through a ratchet 100 or other suitable mechanical device through a ratchet arm 98. Alternately, other magazine shapes and configurations could be employed and could be sub-divided into a plurality of similar compartments and provided with suitable mechanisms to advance each compartment in turn to drop a gasket through the feeder funnel 30. As previously stated, it is also contemplated that other cylindrical type magazines could be employed to rotate in a vertical for advancing gasket holding compartments, one at a time, to an opening in registry above a feeder chute 30 for delivery to the belling mandrel.

Although the invention has been described with reference to the particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

What is claimed is:

1. A gasket holding and feeding mechanism for serially delivering gaskets in axial alignment with a pipe belling mandrel comprising
   a gasket holding magazine positioned in spaced relationshiip to the mandrel,
      the magazine comprising a plurality of gasket holding compartments and means to serially release gaskets from the compartments; and
      a gasket holding and clamping plate positioned below the magazine, the gasket holding and clamping plate comprising left and right gasket clamp halves.

2. The gasket holding and feeding mechanism of claim 1 and a hollow feeder funnel mounted below the magazine, the funnel being positioned to receive the gaskets as they exit the magazine.

3. The gasket holding and feeding mechanism of claim 2 and means to rotatively move the magazine to advance each compartment in turn to a position in registry above the funnel.

4. The gasket holding and feeding mechanism of claim 2 and means to linearly move the magazine to advance each gasket holding compartment in turn to a position in registry above the funnel.

5. The gasket holding and feeding magazine of claim 2, wherein the magazine rotates in a horizontal plane.

6. The gasket holding and feeding mechanism of claim 2, wherein the gasket holding and clamping plate comprises a plurality of side guides to receive the gasket from the funnel and to guide the gasket to a position in axial alignment with the belling mandrel.

* * * * *